US012807300B2

(12) United States Patent
Bryant et al.

(10) Patent No.: US 12,807,300 B2
(45) Date of Patent: Nov. 24, 2026

(54) RELATING TO AIRCRAFT WINGS

(71) Applicant: Airbus Operations Limited, Filton (GB)

(72) Inventors: Stuart Bryant, Filton (GB); Paul Morrell, Filton (GB)

(73) Assignee: Airbus Operations Limited, Filton (GB)

( * ) Notice: Subject to any disclaimer, the term of this patent is extended or adjusted under 35 U.S.C. 154(b) by 0 days.

(21) Appl. No.: 19/291,107

(22) Filed: Aug. 5, 2025

(65) Prior Publication Data

US 2026/0062114 A1 Mar. 5, 2026

(30) Foreign Application Priority Data

Aug. 29, 2024 (GB) ..................................... 2412690

(51) Int. Cl.
*B64C 3/56* (2006.01)
*B64C 23/06* (2006.01)

(52) U.S. Cl.
CPC .............. *B64C 3/56* (2013.01); *B64C 23/072* (2017.05)

(58) Field of Classification Search
CPC ................................ B64C 3/56; B64C 23/072
See application file for complete search history.

(56) References Cited

U.S. PATENT DOCUMENTS 2,406,073 A * 8/1946 Griswold .................. B64C 3/56 244/49
3,980,257 A * 9/1976 Koch ........................ B64C 3/54 244/46
4,221,347 A 9/1980 Hill
6,746,467 B1 6/2004 Taylor et al.
7,762,500 B1 * 7/2010 Dhall ...................... B64C 37/00 244/45 R
12,187,426 B2 1/2025 Risch
2013/0200208 A1 * 8/2013 Koehler .................... B64C 3/56 244/218
2020/0269971 A1 * 8/2020 Xi ......................... B64C 23/072
(Continued)

FOREIGN PATENT DOCUMENTS

BR 9701027 A 11/1998
CN 219313052 U 7/2023
EP 4219295 A1 8/2023

OTHER PUBLICATIONS

United Kingdom Search Report for corresponding United Kingdom Patent Application No. 2412690.6 dated Feb. 19, 2025.

*Primary Examiner* — Jessica B Wong
(74) *Attorney, Agent, or Firm* — Greer, Burns & Crain Ltd.

(57) ABSTRACT

An aircraft including an aircraft wing wherein the aircraft wing includes a fixed wing, a wing tip device at an end of the fixed wing, and a wing tip device actuator configured to move the wing tip device between a flight configuration and a ground configuration. The wing tip device actuator includes a shaft which is rotatable about a shaft axis to selectively displace respective first and second elbows of the wing tip device actuator towards or away from the shaft. The first elbow is connected to the wing tip device and the second elbow is connected to the fixed wing such that movement of the respective elbows away from the shaft causes the wing tip device to move away from the flight configuration and such that movement of the respective elbows towards the shaft causes the wing tip device to move towards the flight configuration.

20 Claims, 4 Drawing Sheets

(56) References Cited

U.S. PATENT DOCUMENTS

| | | | | |
|---|---|---|---|---|
| 2021/0171185 | A1* | 6/2021 | Brwon | B64C 19/00 |
| 2023/0192271 | A1* | 6/2023 | Bate | B64C 3/56 244/49 |
| 2023/0294815 | A1* | 9/2023 | Bae | B64C 23/072 244/218 |
| 2026/0138728 | A1* | 5/2026 | Morrell | B64C 3/56 |

* cited by examiner

RELATING TO AIRCRAFT WINGS

CROSS-REFERENCES TO RELATED APPLICATIONS

This application claims the benefit of the Great Britain Patent Application No. 2412690.6 filed on Aug. 29, 2024, the entire disclosures of which are incorporated herein by way of reference.

BACKGROUND OF THE INVENTION

The present invention concerns an aircraft comprising an aircraft wing, the aircraft wing comprising a wing tip device configurable between a flight configuration and a ground configuration. More particularly, but not exclusively, this invention concerns an aircraft comprising a wing tip device actuator configured to move the wing tip device between the flight configuration and the ground configuration. The invention also concerns an aircraft wing and a wing tip device actuator.

There is a trend towards increasingly higher aspect ratio wings for large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and taxiway usage).

Movable wing tip devices have therefore been introduced into passenger aircraft whereby a wing tip device is movable between a flight configuration for use during flight and a ground configuration for use during ground-based operations. In the flight configuration, the wing tip device forms an extension of the wing and contributes to the lift generated by the wing. In the ground configuration, the wing tip device is moved away from the flight configuration such that the effective span of the aircraft wing is reduced, thereby allowing use of existing gates and taxiways. Such an arrangement is sometimes referred to as a 'folding wing tip'.

A moveable wing tip device requires an actuator to effect movement between the flight configuration and the ground configuration. There is a desire to keep the dimensions of such actuators to a minimum due to the limited space available within the wing, particularly in the vicinity of the moveable wing tip device.

Aspects of the present invention seek to mitigate one or more of the above-mentioned challenges. Alternatively or additionally, aspects of the present invention seek to provide an improved aircraft comprising a moveable wing tip device, an improved aircraft wing, and an improved wing tip device actuator.

SUMMARY OF THE INVENTION

According to a first aspect, the present invention provides a wing tip device actuator for moving a wing tip device of an aircraft wing with respect to a fixed wing of the aircraft wing, the actuator comprising: a first pair of arms, a second pair of arms, and a threaded shaft, each pair of arms comprising an elbow where the arms are hinged to one another, and a connection to the threaded shaft at the other ends of the arms, wherein rotation of the threaded shaft causes the elbows of the arms to move towards or away from the threaded shaft, the elbow of the first pair of arms configured for engagement with the wing tip device and the elbow of the second pair of arms configured for engagement with the fixed wing, such that rotation of the threaded shaft causes the wing tip device to move relative to the fixed wing.

Each of the first pair of arms may be connected to the threaded shaft via respective threaded sleeve assemblies, and each of the second pair of arms may be connected to the threaded shaft via respective threaded sleeve assemblies.

One of the first pair of arms and one of the second pair of arms may share a threaded sleeve assembly, and the other of the first pair of arms and second pair of arms may also share a threaded sleeve assembly.

The wing tip actuator may further comprise a drive unit, such as a screw actuator, the drive unit arranged to drive the rotation of the threaded shaft.

The wing tip actuator may further comprise a control link, the control link comprising a first end through which the threaded shaft extends, and a second end configured for engagement with part of the substructure of the wing tip device or fixed wing.

According to a second aspect, the invention provides an aircraft comprising an aircraft wing, the aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is rotated away from the flight configuration about a hinge axis such that the span of the aircraft wing is reduced, wherein: the aircraft wing comprises a wing tip device actuator configured to move the wing tip device between the flight configuration and the ground configuration; the actuator comprising: a first pair of arms, a second pair of arms, and a threaded shaft, each pair of arms comprising an elbow where the arms are hinged to one another, and a connection to the threaded shaft at the other ends of the arms, wherein rotation of the threaded shaft causes the elbows of the arms to move towards or away from the threaded shaft, the elbow of the first pair of arms being engaged with the wing tip device and the elbow of the second pair of arms being engagement with the fixed wing, such that rotation of the threaded shaft causes the wing tip device to move relative to the fixed wing.

According to a third aspect, the invention provides an aircraft comprising an aircraft wing, the aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is rotated away from the flight configuration about a hinge axis such that the span of the aircraft wing is reduced, wherein the aircraft wing comprises a wing tip device actuator configured to move the wing tip device between the flight configuration and the ground configuration; the wing tip device actuator comprises a shaft, and a first sleeve assembly, a second sleeve assembly, and a control link arranged upon the shaft; the control link is rotatably mounted upon the shaft at a first end and is rotatably mounted to a substructure of the aircraft wing at an opposite second end; each of the first sleeve assembly and the second sleeve assembly comprises an internally threaded sleeve engaged with a threaded portion of the shaft and a bearing sleeve coupled to the internally threaded sleeve, the bearing sleeve being free to rotate about the shaft; the wing tip device actuator further comprises a first pair of actuating arms and a second pair of actuating arms, each pair of actuating arms comprising an elbow at which the respective actuating arms of the pair are pivotally connected to one another; one arm of the first pair of actuating arms is pivotally connected to the internally threaded sleeve of the first sleeve assembly and the other arm of the first pair of actuating arms is pivotally connected to the internally threaded sleeve of the second sleeve assembly; one arm of the second pair of actuating arms is pivotally connected to the bearing sleeve of the first sleeve assembly and the other arm of the first pair of actuating arms is pivotally connected to the bearing sleeve of the second sleeve assembly; the internally threaded sleeve of the first sleeve assembly is engaged with a first threaded portion of the shaft and the internally threaded sleeve of the second sleeve assembly is engaged with a second threaded portion of the shaft; the first threaded portion and second threaded portion have opposing thread directions such that rotation of the shaft about a shaft axis causes the first sleeve assembly and the second sleeve assembly to move in mutually opposing directions along the shaft to selectively displace the respective elbows of the first pair of actuating arms and the second pair of actuating arms towards or away from the shaft; and one of the elbows is connected to the fixed wing and the other of the elbows is connected to the wing tip device such that movement of the respective elbows away from the shaft causes the wing tip device to rotate about the hinge axis away from the flight configuration and such that movement of the respective elbows towards the shaft causes the wing tip device to rotate about the hinge axis towards the flight configuration.

The wing tip device actuator is operated by rotating the shaft about the shaft axis and is thereby configured to be driven by a rotary driving actuator, as opposed to a linear driving actuator (it should be noted that the term "driving actuator" is used herein to refer to the device that drives the movement of the wing tip device actuator). Advantageously, some types of rotary driving actuator suitable for driving the wing tip device actuator may be capable of producing a higher force output for a given unit size when compared to, for example, linear hydraulic actuators. As such, the wing tip device actuator may be driven by a smaller driving actuator than might be required by an equivalent wing tip device actuator driven by a linear driving actuator, which may enable the overall size and mass of the wing tip device actuator and driving actuator to be less than equivalent prior art arrangements. Furthermore, the use of a rotary driving actuator permits the driving actuator to be oriented along a chordwise direction of the wing, thereby reducing the spanwise size associated with the wing tip device actuator and driving actuator.

A further advantage of the wing tip device actuator is that the second pair of actuating arms is coupled to the screw-driven movement of the first pair of actuating arms but is free to rotate about the shaft, and that the wing tip actuator itself is rotatably mounted to an aircraft wing substructure. This arrangement enables the second pair of arms to follow the rotation of the wing tip device as the wing tip device is moved to the ground configuration, which may ensure that actuating force is optimally transferred from the wing tip device actuator into the wing tip device as it rotates. Furthermore, protrusions from the wing geometry in the vicinity of the hinge are minimized when the wing tip device is in the ground configuration by the wing tip device actuator effectively folding with the wing tip device.

The control link may be rotatable about an axis of the substructure which is parallel with the hinge axis. The aircraft wing may comprise a hinge pin connecting the fixed wing and the wing tip device. The wing tip device may be rotatable about the hinge pin between the flight configuration and the ground configuration. The substructure of the aircraft wing to which the control link is rotatably mounted may be the hinge pin. The hinge pin may define the hinge axis. The substructure of the aircraft wing to which the control link is rotatably mounted may form part of the fixed wing. The substructure of the aircraft wing to which the control link is rotatably mounted may form part of the wing tip device.

The control link may be rotatably mounted upon the shaft by the shaft being situated within a hole provided in the control link. The control link may be rotatably mounted to the substructure of the aircraft wing by the substructure being situated within a hole provided in the control link. The control link may be rotatably mounted upon the shaft between the first threaded portion of the shaft and the second threaded portion of the shaft. The control link may be prevented from moving along the shaft axis.

The wing tip device actuator may comprise one or more additional control links. The additional control links may have any of the features of the control link described above. Each control link may be rotatably mounted upon the shaft at a first end and rotatably mounted to a substructure of the aircraft wing at an opposite second end. A second control link may be spaced apart along the shaft from the first control link such that one of the first sleeve assembly or the second sleeve assembly is positioned between the first control link and the second control link. A third control link may be spaced apart along the shaft from the first control link such that the other one of the first sleeve assembly or the second sleeve assembly is positioned between the first control link and the third control link. Where there is more than one control link, the control links may be connected. For example, the control links may be provided in a unitary structure. The shaft axis may be parallel with the hinge axis.

The bearing sleeve of the first sleeve assembly may comprise a first sleeve part situated on a first side of the internally threaded sleeve and a second sleeve part situated on an opposite second side of the internally threaded sleeve. The first sleeve part and the second sleeve part may be connected by a connecting member that spans over the internally threaded sleeve. The connecting member of the first sleeve assembly may comprise a flange to which an arm of the second pair of actuating arms is pivotally connected. The bearing sleeve of the second sleeve assembly may comprise a first sleeve part situated on a first side of the internally threaded sleeve and a second sleeve part situated on an opposite second side of the internally threaded sleeve. The first sleeve part and the second sleeve part may be connected by a connecting member that spans over the internally threaded sleeve. The connecting member of the second sleeve assembly may comprise a flange to which an arm of the second pair of actuating arms is pivotally connected. Configured as such, the bearing sleeve of the first or second sleeve assembly (and therefore the second pair of actuating arms) is free to rotate about the shaft but is prevented from moving along the axis of the shaft independently of the internally threaded sleeve by the first sleeve part and second sleeve part abutting with the internally threaded sleeve. Conversely, when the internally threaded sleeve is moved along the shaft as the shaft rotates, the internally threaded sleeve abuts with either the first sleeve part or the second sleeve part to move the bearing sleeve along the shaft with the internally threaded sleeve.

The internally threaded sleeve of the first sleeve assembly or the second sleeve assembly may comprise a first sleeve part situated on a first side of the bearing sleeve and a second sleeve part situated on an opposite second side of the bearing sleeve. One or both of the first sleeve part and the second sleeve part of the internally threaded sleeve may be internally threaded. The first sleeve part and the second sleeve part may be connected by a connecting member that spans over the bearing sleeve; the connecting member may comprise a flange to which an arm of the first pair of actuating arms is pivotally connected.

For either or both the first sleeve assembly and the second sleeve assembly, the bearing sleeve may be rotatably mounted directly to the shaft with no intermediate parts between the bearing sleeve and the internally threaded sleeve. The bearing sleeve may be rotatably mounted to the internally threaded sleeve.

One or both of the first sleeve assembly and the second sleeve assembly may comprise a flange which extends from an outer surface of the internally threaded sleeve and an arm of the first pair of actuating arms may be pivotally connected to the flange.

The aircraft wing may comprise a roller screw actuator coupled to the shaft of the wing tip device actuator. The roller screw actuator may be configured to rotate the shaft to move the wing tip device between the flight configuration and the ground configuration.

The aircraft may of course have a second wing having any of the features of the wing described above.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and optionally more than 75 passengers. The aircraft may be a commercial aircraft, for example a commercial passenger aircraft, for example a single aisle or twin aisle aircraft. The aircraft need not be configured for carrying passengers but could, for example, be an aircraft of an equivalent size configured for cargo and/or used on a non-commercial basis. The aircraft may have a maximum take-off weight (MTOW) of at least 20 tons, optionally at least 40 tons, and possibly 50 tons or more. The aircraft may have an operating empty weight of at least 20 tons, optionally at least 30 tons, and possibly about 40 tons or more.

According to a fourth aspect, the present invention provides an aircraft wing suitable for use as the aircraft wing of the aircraft of the first aspect of the invention. The aircraft wing of the fourth aspect of the invention may have any of the features described in relation to the wing tip device actuator or aircraft wing of the aircraft of the first, second, or third aspect of the invention.

According to a fifth aspect, the present invention provides a wing tip device actuator for moving a wing tip device of an aircraft wing with respect to a fixed wing of the aircraft wing, wherein the wing tip device actuator comprises a shaft, and a first sleeve assembly, a second sleeve assembly, and a control link arranged upon the shaft; the control link is rotatably mounted upon the shaft at a first end and is configured to be rotatably mounted to a substructure of the aircraft wing at an opposite second end; each of the first sleeve assembly and the second sleeve assembly comprises an internally threaded sleeve engaged with a threaded portion of the shaft and a bearing portion coupled to the internally threaded sleeve, the bearing portion being free to rotate about the shaft; the wing tip device actuator further comprises a first pair of actuating arms and a second pair of actuating arms, each pair of actuating arms comprising an elbow at which the respective actuating arms of the pair are pivotally connected to one another; one arm of the first pair of actuating arms is pivotally connected to the internally threaded sleeve of the first sleeve assembly and the other arm of the first pair of actuating arms is pivotally connected to the internally threaded sleeve of the second sleeve assembly; one arm of the second pair of actuating arms is pivotally connected to the bearing portion of the first sleeve assembly and the other arm of the first pair of actuating arms is pivotally connected to the bearing portion of the second sleeve assembly; the internally threaded sleeve of the first sleeve assembly is engaged with a first threaded portion of the shaft and the internally threaded sleeve of the second sleeve assembly is engaged with a second threaded portion of the shaft; and the first threaded portion and second threaded portion have opposing thread directions such that rotation of the shaft about the axis of the shaft causes the first sleeve assembly and the second sleeve assembly to move in mutually opposing directions along the shaft to selectively displace the respective elbows of the first pair of actuating arms and the second pair of actuating arms towards or away from the shaft.

It will of course be appreciated that features described in relation to one aspect of the present invention may be incorporated into other aspects of the present invention. For example, the wing tip device actuator of any aspect of the invention may incorporate any of the features described in relation to the wing tip device actuator of the aircraft of the other aspects of the invention and vice versa.

BRIEF DESCRIPTION OF THE DRAWINGS

Embodiments of the present disclosure will now be described by way of example only with reference to the accompanying schematic drawings of which.

DETAILED DESCRIPTION OF THE PREFERRED EMBODIMENTS

Figure 1:
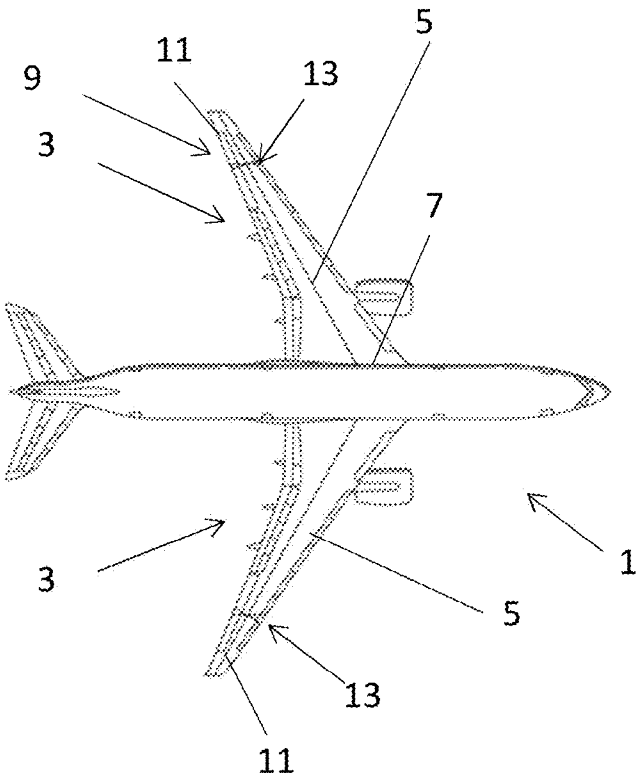
FIG. 1 shows a plan view of an aircraft according to an embodiment of the invention.
Figure 2:
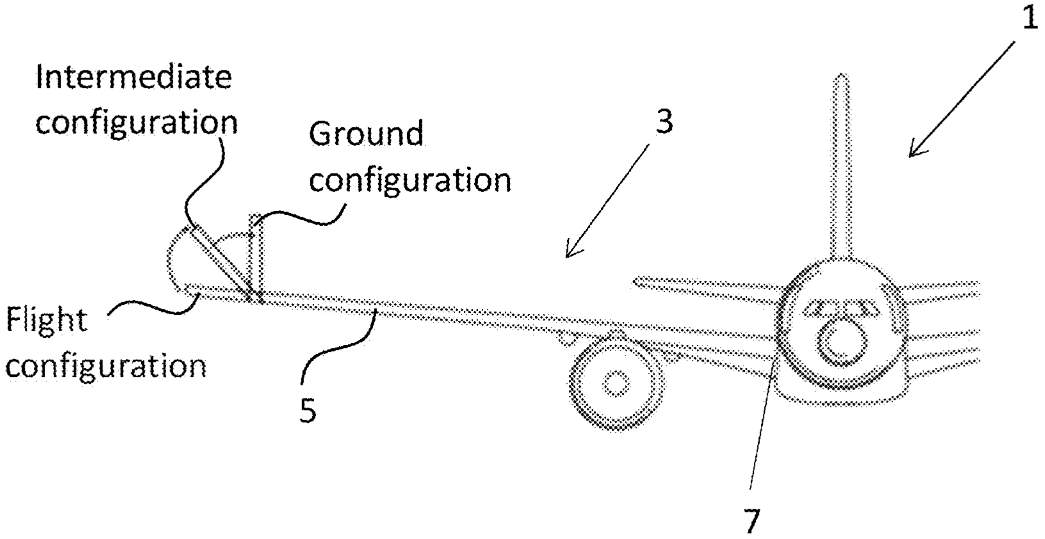
FIG. 2 shows a frontal view of the aircraft of FIG. 1.

FIGS. 1 and 2 show a plan view and a front view of an aircraft 1 according to an embodiment of the invention. The aircraft 1 comprises two wings 3 extending outwardly from the fuselage (only one wing is fully visible in FIG. 2). Each wing 3 comprises a fixed wing 5 extending from a root 7 to a tip 9. At the tip 9 of the fixed wing 5, the wing 3 also comprises a moveable wing tip device 11. In this embodiment, the wing tip device 11 comprises a planar wing tip extension. The wing tip device 11 is rotatably mounted on a hinge joint 13, having a hinge axis Y. As such, the wing tip device 11 is able to rotate about the hinge joint 13 relative to the fixed wing 5.

Referring to FIG. 2, the wing tip device 11 is rotatable about the hinge joint 13 between a flight configuration and a ground configuration. FIG. 2 also shows the wing tip device 11 in an intermediate configuration, part-way between the flight configuration and the ground configuration.

In the flight configuration, the wing tip device 11 is an extension of the fixed wing 5. Accordingly, the upper and lower surfaces of the fixed wing 5 are continuous with the upper and lower surfaces of the wing tip device 11. The leading and trailing edges of the fixed wing 5 are also continuous with the respective leading and trailing edges of the wing tip device 11.

In the ground configuration, the wing tip device 11 is oriented in a substantially upright position such that the effective span of the wing 3 is reduced. The movable wing tip device 11 therefore enables the aircraft 1 to have a relatively large wingspan during flight and to comply with airport gate limits when on the ground.

Figure 3:
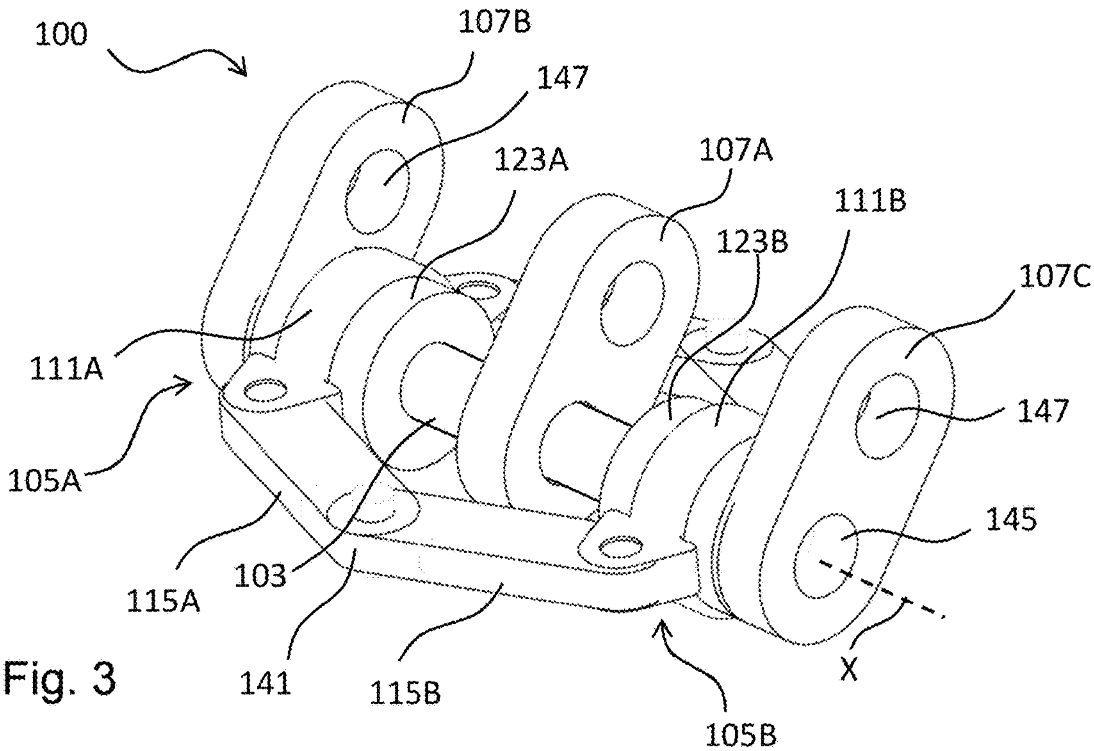
FIG. 3 is a perspective view of a wing tip device actuator of the aircraft.
Figure 4:
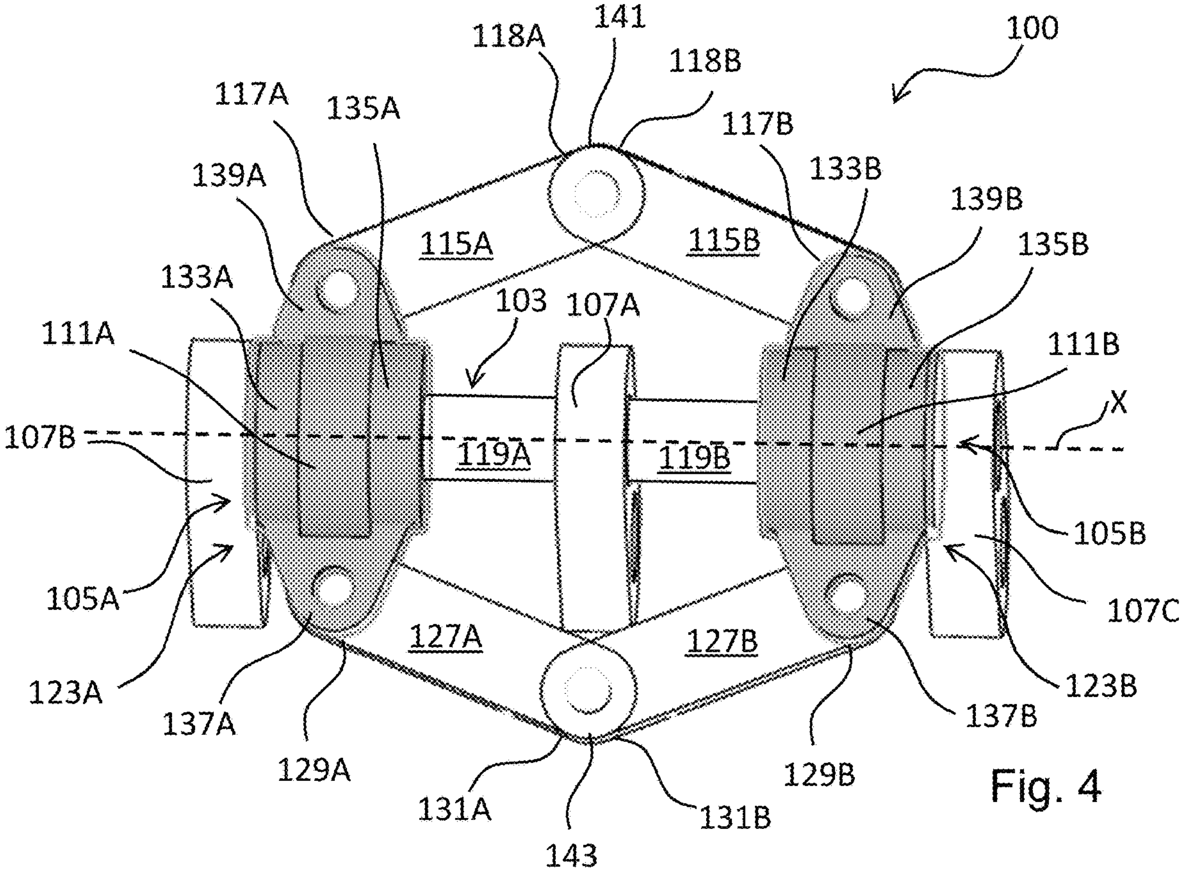
FIG. 4 is a bottom elevation view of the wing tip device actuator.

The wing tip device 11 is moved between the ground configuration and the flight configuration by a wing tip device actuator 100, which is shown in isolation in FIG. 3 and FIG. 4. The wing tip device actuator 100 comprises a shaft 103, and a first sleeve assembly 105A, a second sleeve assembly 105B, and a plurality of control links 107A-C arranged upon the shaft 103.

The first sleeve assembly 105A and the second sleeve assembly 105B are substantially identical, apart from having internally threaded sleeves 111A, 111B which are internally threaded in opposing directions for reasons which are described below. The first and second sleeve assemblies 105A, 105B will therefore be described with reference to the first sleeve assembly 105A only. However, the features that the second sleeve assembly 105B has in common with the first sleeve assembly 105A are labelled in the figures with the same reference numerals as used herein to refer to the features of the first sleeve assembly but suffixed with "B" instead of "A".

The first sleeve assembly 105A comprises an internally threaded sleeve 111A and a bearing sleeve 123A. The bearing sleeve 123A comprises a first sleeve part 133A which surrounds and is rotatably mounted upon the shaft 103 on a first side of the internally threaded sleeve 111A and a second sleeve part 135A which surrounds and is rotatably mounted upon the shaft 103 on an opposite second side of the internally threaded sleeve 111A. The first sleeve part 133A is connected to the second sleeve part 135A by a connecting member comprising a flange 137A which is provided with a hole. A similarly arranged flange 139A provided with a hole extends from an outer surface of the internally threaded sleeve 111A.

Configured as described above, the bearing sleeve 123A is free to rotate about the shaft 103 but is coupled to the position of the internally threaded sleeve 111A and is prevented from moving along the axis X of the shaft 103 independently of the internally threaded sleeve 111A by the first sleeve part 133A and second sleeve part 135A abutting with the first threaded sleeve 111A. However, when the internally sleeve 111A moves along the shaft 103, the internally threaded sleeve 111A abuts with either the first sleeve part 133A or the second sleeve part 135A to move the bearing sleeve 123A along the shaft 103 with the internally threaded sleeve 111A.

A first pair of actuating arms 115A, 115B and a second pair of actuating arms 127A, 127B are connected between the first sleeve assembly 105A and the second sleeve assembly 105B. The first pair of actuating arms comprises a first arm 115A and a second arm 115B. The first arm 115A is pivotally connected to the flange 139A of the internally threaded sleeve 111A of the first sleeve assembly 105A at a first end 117A of the first arm 115A. Likewise, the second arm 115B is pivotally connected to the flange 139B of the internally threaded sleeve 111B of the second sleeve assembly 105B at a first end 117B of the second arm 115B. At the respective second ends 118A, 118B of the first and second arms 115A, 115B, the first and second arms 115A and 115B are pivotally connected to one another at a first elbow 141.

The second pair of actuating arms comprises a first arm 127A and a second arm 127B. The first arm 127A is pivotally connected to the flange 137A of the bearing sleeve 123A of the first sleeve assembly 105A at a first end 129A of the first arm 127A. Likewise, the second arm 127B is pivotally connected to the flange 137B of the bearing sleeve 123B of the second sleeve assembly 105B at a first end 129B of the second arm 127B. At the respective second ends 131A, 131B of the first and second arms 127A, 127B, the first and second arms 127A and 127B are pivotally connected to one another at a second elbow 143.

The shaft 103 comprises a first threaded portion 119A and a second threaded portion 119B arranged along an axis X of the shaft 103, the first threaded portion 119A and the second threaded portion 119B having opposing thread directions. The internally threaded sleeve 111A of the first sleeve assembly 105A is engaged with the first threaded portion 119A of the shaft 103 and the internally threaded sleeve 111B of the second sleeve assembly 105B is engaged with the second threaded portion 119B of the shaft 103. The wing tip device actuator 100 is thereby arranged such that rotation of the shaft 103 about the shaft axis X causes the first and second threaded portions 119A, 119B of the shaft 103 to engage with the internally threaded sleeves 111A, 111B of the first and second sleeve assemblies 105A, 105B to move the first and second sleeve assemblies 105A, 105B in mutually opposing directions along the shaft 103, thereby displacing first elbow 141 and the second elbow 143 towards or away from the shaft 103.

The wing tip device actuator 100 is configured to be rotatably mounted to a substructure of the aircraft wing 3 via the control links 107A-C. A first control link 107A is situated on the shaft 103 between the first threaded portion 119A of the shaft 103 and the second threaded portion 119B of the shaft 103. A second control link 107B is spaced apart along the shaft 103 from the first control link 107A on a first side of the first control link 107A such the first sleeve assembly 105A is positioned between the first control link 107A and the second control link 107B. A third control link 107C is spaced apart along the shaft 103 from the first control link 107A on an opposite second side of the first control link 107A such that the second sleeve assembly 105B is positioned between the first control link 107A and the third control link 107C. Each of the control links 107A comprises a first hole 145 in which the shaft 103 is received and a second hole 147 which is configured to rotatably receive a substructure of the aircraft wing 3, such as a hinge pin 15 of the hinge joint 13.

Figure 5A:
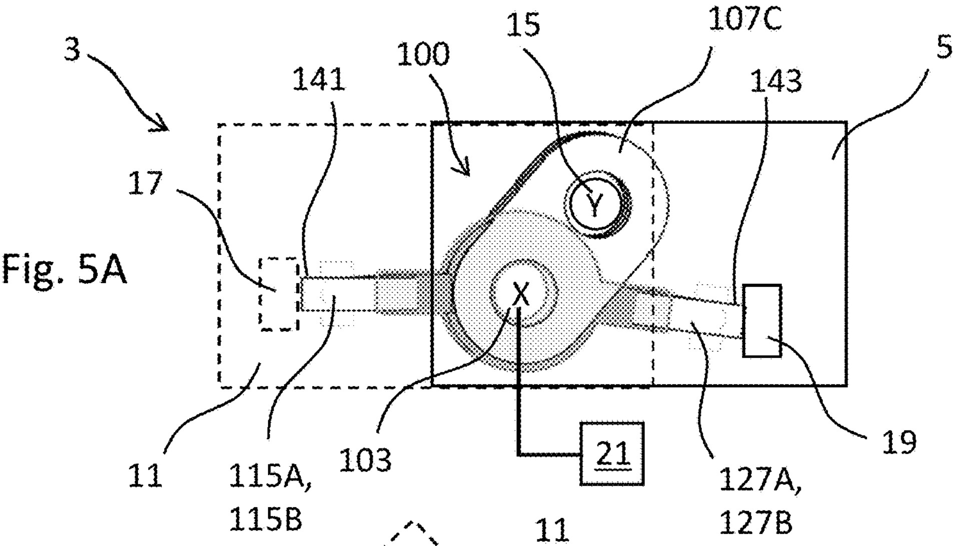
FIGS. 5A to 5C are schematic views of a portion of a wing of the aircraft which show the wing tip device in a flight configuration, an intermediate configuration, and a ground configuration, respectively.
Figure 5B:
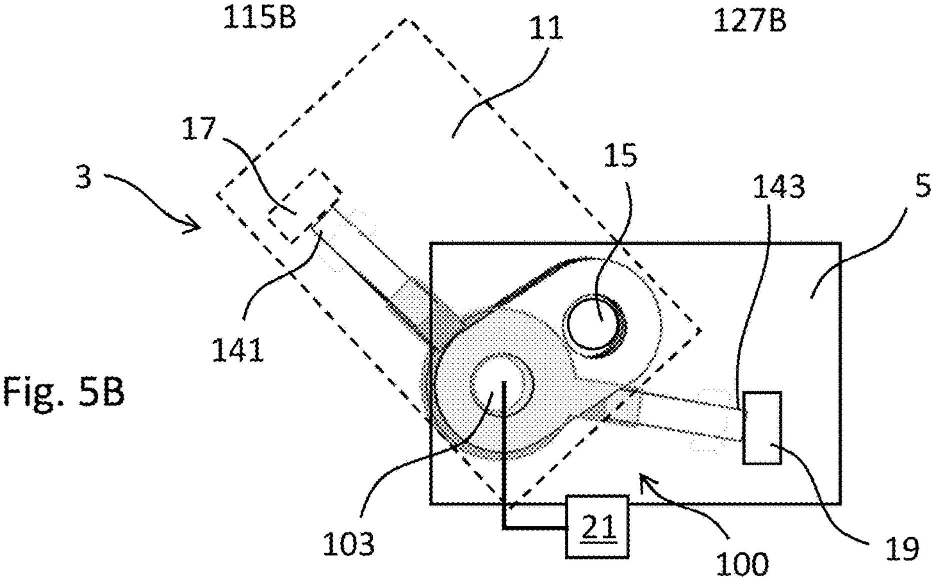
Figure 5C:
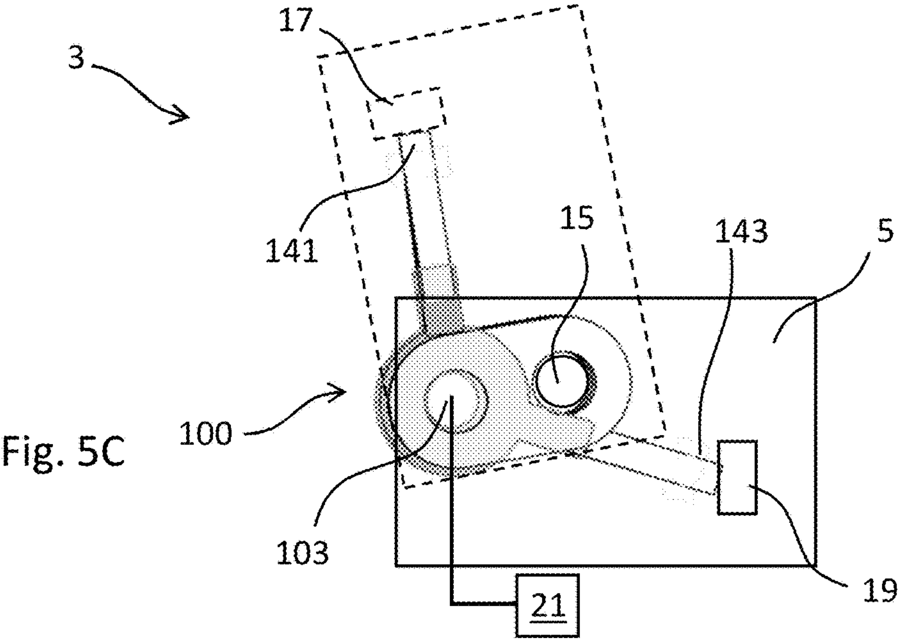
Figure 6A:
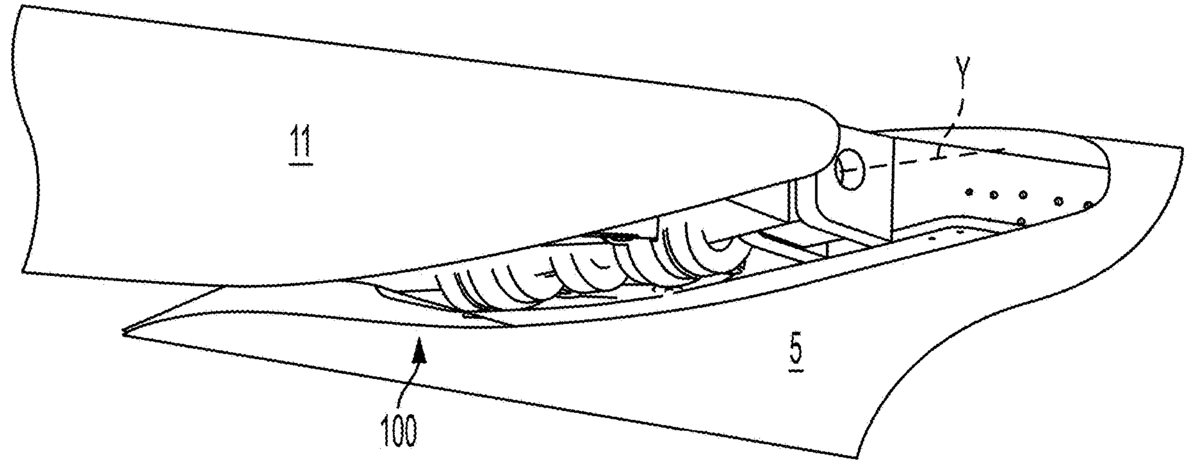
FIGS. 6A to 6C are perspective views of a portion of the wing of the aircraft which show the wing tip device in a flight configuration, an intermediate configuration, and a ground configuration, respectively.
Figure 6B:
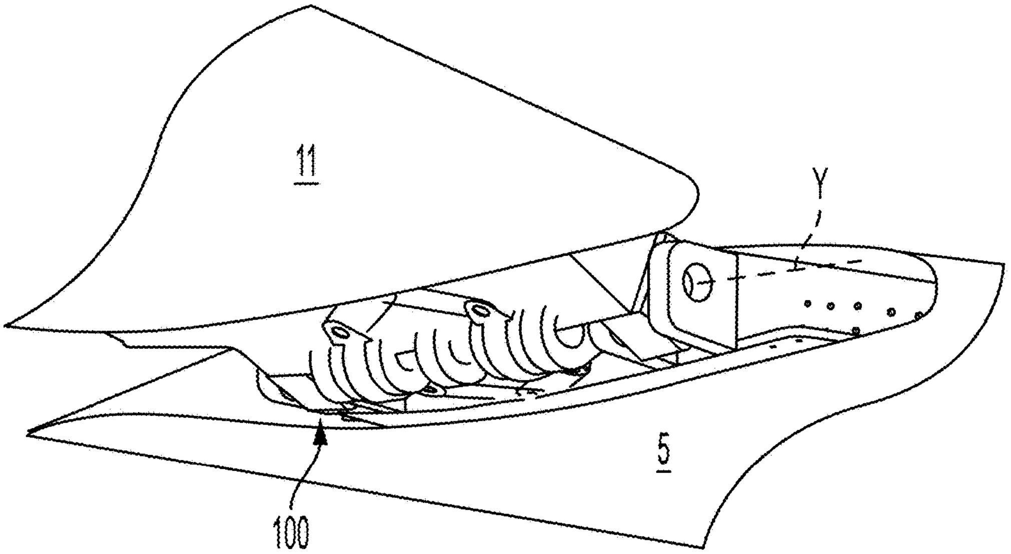
Figure 6C:
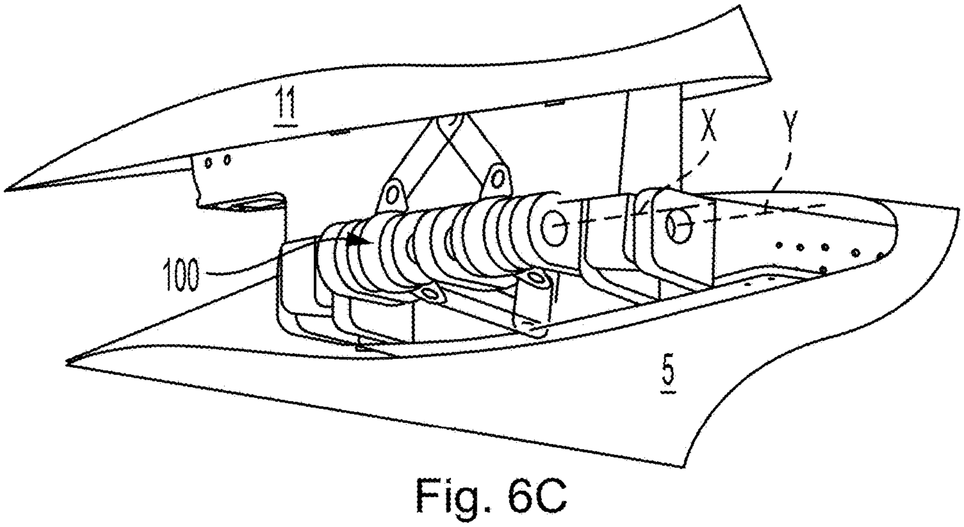

FIGS. 5A to 5C are schematic drawings showing the wing tip device actuator 100 connected between the fixed wing 5 and the wing tip device 11 of the aircraft wing 3, with FIG. 5A showing the wing tip device 11 in the flight configuration, FIG. 5B showing the wing tip device 11 in the intermediate configuration, and FIG. 5C showing the wing tip device 11 in the ground configuration. FIGS. 6A to 6C are corresponding perspective views of the aircraft wing 3 in each of the configurations shown in FIGS. 5A to 5C, respectively.

With reference to FIG. 5A, the wing tip device actuator 100 is arranged such that the hinge pin 15 of the hinge joint 13 is received in the holes 147 of each of the control links 107A-C. The shaft axis X of the wing tip device actuator 100 is therefore parallel with the hinge axis Y, the hinge axis Y being defined by the hinge pin 15 (note that the shaft axis X and the hinge axis Y extend out of the page in FIG. 5A). The first elbow 141 is connected to a substructure 17 of the wing tip device 11 and the second elbow 143 is connected to a substructure 19 of the fixed wing 5. The aircraft wing comprises a roller screw actuator 21 which is coupled to the shaft 103 of the wing tip device actuator 100 and configured to rotate the shaft 103 to thereby move the wing tip device 11 between the flight configuration and the ground configuration.

As can be seen in FIG. 5A, when the wing tip device 11 is in the flight configuration, the first elbow 141 and second elbow 143 of the wing tip device actuator 100 are situated on opposing sides of the shaft 103, with the first pair of actuating arms 115A, 115B and second pair of actuating arms 127A, 127B being approximately parallel with one another. Note that FIG. 3 and FIG. 4 also show the wing tip device actuator 100 configured to the flight configuration shown in FIG. 5A.

In order to move the wing tip device 11 to the ground configuration, the roller screw actuator 21 is operated to rotate the shaft 103 in a first direction to displace the elbows 141, 143 away from the shaft, thereby causing the first elbow 141 to push the substructure 17 of the wing tip device 11 away from the substructure 19 of the fixed wing 5 to rotate the wing tip device 11 about the hinge axis Y. Because the position of the hinge pin 15 is fixed with respect to the substructure 19 of the fixed wing 5, the wing tip device actuator 100 is forced to rotate about the hinge pin 15 as the second elbow 143 is moved away from the shaft, as can be best seen by comparing FIGS. 5A to 5C. Furthermore, because the second pair of actuating arms 127A, 127B is free to rotate about the shaft 103, the first pair of actuating arms 115A, 115B follows the rotation of the wing tip device 11 as the wing tip device 11 is moved to the ground configuration. This arrangement may ensure that actuating force is optimally transferred from the wing tip device actuator into the wing tip device as it rotates. Furthermore, protrusions from the wing geometry in the vicinity of the hinge are minimized when the wing tip device is in the ground configuration by the wing tip device actuator effectively folding with the wing tip device. It will of course be understood that in order to move the wing tip device 11 from the ground configuration to the flight configuration, the screw actuator 21 is operated to rotate the shaft 103 in an opposite second direction to move the elbows 141, 143 towards the shaft, thereby causing the wing tip device 11 to be rotated about the hinge axis Y towards the flight configuration.

While the present invention has been described and illustrated with reference to particular embodiments, it will be appreciated by those of ordinary skill in the art that the invention lends itself to many different variations not specifically illustrated herein. For example, while the example described above comprises a first elbow engaged with the wing tip device and a second elbow engaged with the fixed wing, in some embodiments the first elbow may be engaged with the fixed wing and the second elbow may be engaged with the wing tip device. Additionally, while the elbows of the example described above are formed by the ends of pivotally connected arms, in some embodiments of the invention an elbow may alternatively be formed by an intermediate member pivotally connected between the arms.

In some embodiments, either or both of the sleeve assemblies may be configured similarly to the sleeve assemblies 105A, 105B described above but with the internally threaded sleeve becoming the bearing sleeve and the bearing sleeve becoming the internally threaded sleeve; in these embodiments the internally threaded sleeve may comprise an internally threaded first sleeve part situated on a first side of the bearing sleeve and an internally threaded second sleeve part situated on an opposite second side of the bearing sleeve. In a similar embodiment where the internally threaded sleeve comprises two sleeve parts, only one of the sleeve parts may be internally threaded; for example, the internally threaded sleeve may comprise an internally threaded first sleeve part situated on a first side of the bearing sleeve and a second sleeve part situated on an opposite second side of the bearing sleeve, wherein the second sleeve part is not internally threaded but may instead be configured similarly to one of the sleeve parts of the bearing sleeve of the first and second sleeve assemblies 105A, 105B described above.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, while of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing tip device actuator configured to move a wing tip device of an aircraft wing with respect to a fixed wing of the aircraft wing, the wing tip device actuator comprising:

a first pair of arms, each arm having a first and second end, a second pair of arms, each arm having a first and second end, and a threaded shaft, each pair of arms comprising an elbow where the first ends of the arms are hinged to one another, and a connection to the threaded shaft at the second ends of the arms, wherein rotation of the threaded shaft causes the elbows of the arms to move towards or away from the threaded shaft, and the elbow of the first pair of arms configured to engage with the wing tip device and the elbow of the second pair of arms configured to engage with the fixed wing, such that rotation of the threaded shaft causes the wing tip device to move relative to the fixed wing.

2. The wing tip device actuator as claimed in claim 1, wherein each of the first pair of arms is connected to the threaded shaft via respective threaded sleeve assemblies, and each of the second pair of arms is connected to the threaded shaft via respective threaded sleeve assemblies.

3. The wing tip device actuator as claimed in claim 2, wherein one arm of the first pair of arms and one arm of the second pair of arms share a threaded sleeve assembly, and a second arm of the first pair of arms and a second arm of the second pair of arms also share a threaded sleeve assembly.

4. The wing tip actuator as claimed in claim 1, further comprising a drive unit, the drive unit configured to drive the rotation of the threaded shaft.

5. The wing tip actuator as claimed in claim 1, further comprising a control link, the control link comprising a first end through which the threaded shaft extends, and a second end configured to engage with part of a substructure of the wing tip device or fixed wing.

6. An aircraft comprising an aircraft wing, the aircraft wing comprising:

a fixed wing and a wing tip device at a tip thereof, wherein the wing tip device is configurable between: (i) a flight configuration for use during flight and (ii) a ground configuration for use during ground-based operations, in which ground configuration the wing tip device is rotated away from the flight configuration about a hinge axis such that a span of the aircraft wing is reduced, and a wing tip device actuator according to claim 1, configured to move the wing tip device between the flight configuration and the ground configuration.

7. The aircraft according to claim 6, wherein the wing tip device actuator further comprises:

a shaft, and a first sleeve assembly, a second sleeve assembly, and a control link arranged upon the shaft;

the control link is rotatably mounted upon the shaft at a first end and is rotatably mounted to a substructure of the aircraft wing at an opposite second end;

each of the first sleeve assembly and the second sleeve assembly comprises an internally threaded sleeve engaged with a threaded portion of the shaft and a bearing sleeve coupled to the internally threaded sleeve, the bearing sleeve being free to rotate about the shaft, one arm of the first pair of actuating arms is pivotally connected to the internally threaded sleeve of the first sleeve assembly and the other arm of the first pair of actuating arms is pivotally connected to the internally threaded sleeve of the second sleeve assembly;

one arm of the second pair of actuating arms is pivotally connected to the bearing sleeve of the first sleeve assembly and the other arm of the second pair of actuating arms is pivotally connected to the bearing sleeve of the second sleeve assembly;

the internally threaded sleeve of the first sleeve assembly is engaged with a first threaded portion of the shaft and the internally threaded sleeve of the second sleeve assembly is engaged with a second threaded portion of the shaft; and the first threaded portion and second threaded portion have opposing thread directions such that rotation of the shaft about a shaft axis causes the first sleeve assembly and the second sleeve assembly to move in mutually opposing directions along the shaft to selectively displace the respective elbows of the first pair of actuating arms and the second pair of actuating arms towards or away from the shaft;

wherein an engagement of the elbow of the first pair of arms with the fixed wing and an engagement of the elbow of the second pair of arms with the wing tip device is such that movement of the respective elbows away from the shaft causes the wing tip device to rotate about the hinge axis away from the flight configuration and is such that movement of the respective elbows towards the shaft causes the wing tip device to rotate about the hinge axis towards the flight configuration.

8. The aircraft according to claim 7, wherein the control link is rotatable about an axis of the substructure which is parallel with the hinge axis.

9. The aircraft according to claim 7, wherein the aircraft wing comprises a hinge pin connecting the fixed wing and the wing tip device; the wing tip device is rotatable about the hinge pin between the flight configuration and the ground configuration; and the substructure of the aircraft wing to which the control link is rotatably mounted is the hinge pin.

10. The aircraft according to claim 7, wherein the control link is rotatably mounted upon the shaft by the shaft being situated within a first hole provided in the control link; and the control link is rotatably mounted to the substructure of the aircraft wing by the substructure being situated within a second hole provided in the control link.

11. The aircraft according to claim 7, wherein the control link is rotatably mounted upon the shaft between the first threaded portion of the shaft and the second threaded portion of the shaft.

12. The aircraft according to claim 7, wherein the control link is prevented from moving along the shaft axis.

13. The aircraft according to claim 7, wherein the wing tip device actuator comprises one or more additional control links, wherein each control link is rotatably mounted upon the shaft at a first end and is rotatably mounted to a substructure of the aircraft wing at an opposite second end.

14. The aircraft according to claim 7, wherein the shaft axis is parallel with the hinge axis.

15. The aircraft according to claim 7, wherein the bearing sleeve of the first sleeve assembly comprises a first sleeve part situated on a first side of the internally threaded sleeve and a second sleeve part situated on an opposite second side of the internally threaded sleeve; and the first sleeve part and the second sleeve part are connected by a connecting member that spans over the internally threaded sleeve.

16. The aircraft according to claim 15, wherein the connecting member of the first sleeve assembly comprises a flange to which an arm of the second pair of actuating arms is pivotally connected.

17. The aircraft according to claim 7, wherein one or both of the first sleeve assembly and the second sleeve assembly comprises a flange which extends from an outer surface of the internally threaded sleeve and an arm of the first pair of actuating arms is pivotally connected to the flange.

18. The aircraft according to claim 7, wherein the aircraft wing comprises a roller screw actuator coupled to the shaft of the wing tip device actuator and the roller screw actuator is configured to rotate the shaft to move the wing tip device between the flight configuration and the ground configuration.

19. An aircraft wing configured as the aircraft wing of the aircraft of claim 7.

20. A wing tip device actuator for moving a wing tip device of an aircraft wing with respect to a fixed wing of the aircraft wing, wherein:

the wing tip device actuator comprises a shaft, and a first sleeve assembly, a second sleeve assembly, and a control link arranged upon the shaft;

the control link is rotatably mounted upon the shaft at a first end and is configured to be rotatably mounted to a substructure of the aircraft wing at an opposite second end;

each of the first sleeve assembly and the second sleeve assembly comprises an internally threaded sleeve engaged with a threaded portion of the shaft and a bearing portion coupled to the internally threaded sleeve, the bearing portion being free to rotate about the shaft, the wing tip device actuator further comprises a first pair of actuating arms and a second pair of actuating arms, each pair of actuating arms comprising an elbow at which the respective actuating arms of the pair are pivotally connected to one another, one elbow being configured to engage with the fixed wing and the other elbow being configured to engage with the wing tip device;

one arm of the first pair of actuating arms is pivotally connected to the internally threaded sleeve of the first sleeve assembly and the other arm of the first pair of actuating arms is pivotally connected to the internally threaded sleeve of the second sleeve assembly;

one arm of the second pair of actuating arms is pivotally connected to the bearing portion of the first sleeve assembly and the other arm of the first pair of actuating arms is pivotally connected to the bearing portion of the second sleeve assembly;

the internally threaded sleeve of the first sleeve assembly is engaged with a first threaded portion of the shaft and the internally threaded sleeve of the second sleeve assembly is engaged with a second threaded portion of the shaft; and the first threaded portion and second threaded portion have opposing thread directions such that rotation of the shaft about an axis of the shaft causes the first sleeve assembly and the second sleeve assembly to move in mutually opposing directions along the shaft to selectively displace the respective elbows of the first pair of actuating arms and the second pair of actuating arms towards or away from the shaft.

* * * * *